United States Patent [19]

Camire

[11] Patent Number: 4,993,447
[45] Date of Patent: Feb. 19, 1991

[54] PRESSURE-REGULATING METHOD AND APPARATUS

[75] Inventor: Arthur Camire, Calumet City, Ill.

[73] Assignee: D&K Custom Machine Design, Inc., Elk Grove, Ill.

[21] Appl. No.: 421,238

[22] Filed: Oct. 13, 1989

[51] Int. Cl.[5] ............................................. G05D 11/03
[52] U.S. Cl. .......................................... 137/9; 137/118
[58] Field of Search ...................... 137/9, 98, 101, 118

[56] References Cited

U.S. PATENT DOCUMENTS

| | | | |
|---|---|---|---|
| 2,270,304 | 1/1942 | Jacobsson | 137/118 |
| 2,661,756 | 12/1953 | Noon | 137/118 |
| 3,997,107 | 12/1976 | Block | 137/118 X |

*Primary Examiner*—Robert G. Nilson
*Attorney, Agent, or Firm*—Wallenstein Wagner & Hattis, Ltd.

[57] ABSTRACT

A pressure-regulating device for controlling fluid pressure flow from a source to two fluid pressure-operated devices (40, 50) includes first and second pressure regulators (22, 24), each having an inlet section, an outlet section and a control section with a diverting circuit (82) leading from the first outlet section to the second control section and having a uni-directional check valve (80) providing a pressure drop. Each regulating section has a mechanical force applicator (60, 70) to apply a predetermined outlet pressure.

4 Claims, 1 Drawing Sheet

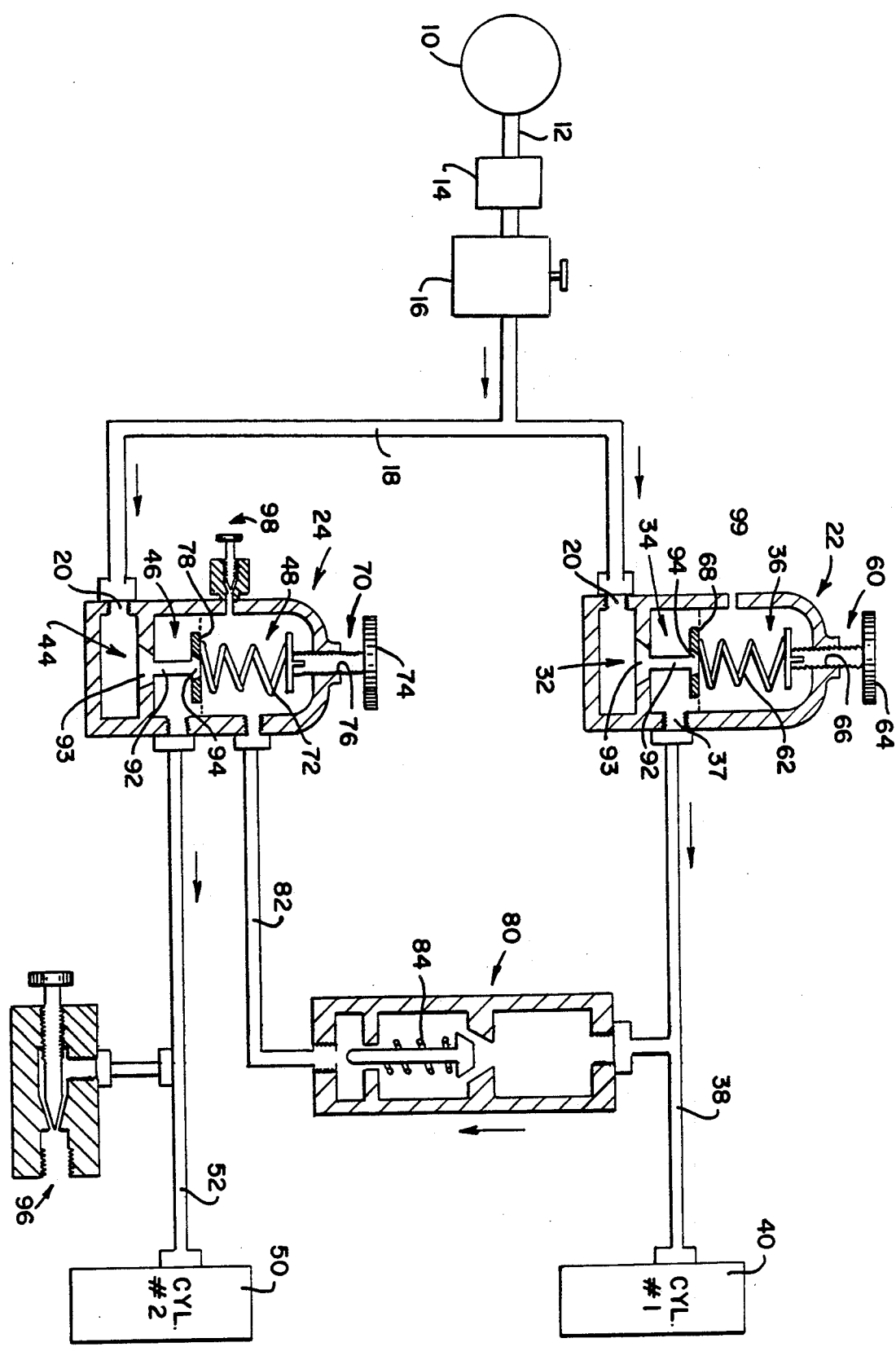

PRESSURE-REGULATING METHOD AND APPARATUS

DESCRIPTION

1. Technical Field

The present invention relates generally to a method and apparatus for controlling the flow of fluid pressure to a plurality of devices, and more particularly to controlling the differential output pressure to at least two pressurized fluid-operated devices from the common input pressure source.

2. Background Prior Art

Laminating systems for applying two sheets of plastic film on opposite surfaces of an article have been known for a number of years. In conventional systems of this type, a pair of supply rolls supply two continuous webs of laminating film between and into the nip of a pair of pressure laminating rolls, which are positively driven to draw the article into the nip and laminate the film to the opposite surface thereof. For this purpose, the respective webs of laminating film have a heat-activated coating on one surface thereof and the system includes some type of heating means to activate the adhesive and bond the film to the surfaces of the article. Conventionally, pull rollers are located downstream of the pressure laminating rolls and maintain tension on the laminated article as it is moved between cooling fans located above and below the laminated article.

One type of laminating machine that has received a remarkable degree of commercial success is shown in U.S. Pat. No. 4,743,334, issued to Karl Singer, and assigned to the assignee of the present invention.

Conventionally, in a system of the type disclosed in the Singer patent, the lower pressure laminating roll and the lower pull roll are positively driven by a common power source and the upper pressure laminating roller and upper pull roller are hydraulically biased through the use of fluid cylinders. For cost considerations, the fluid or air cylinders are spring-biased to the retracted position and are positively biased through the use of air pressure on the head end of the cylinder.

Also, in systems of this type, it is customary to provide two fluid cylinder assemblies that are respectively positioned at opposite ends of the roller-supporting shaft so that independent pressure can be applied to opposite ends of the rollers; for example, specifically, the laminating rollers.

In prior art systems of this type, it is customary to utilize the fluid pressure in the cylinders to control the flow of the laminated article at the outlet end of the pressure laminating rollers. This is important to maintain proper alignment of the laminated article with respect to the remainder of the machine, in the area, for example, where the linear edges are trimmed to produce the final product, which is cut into individual pieces at the conclusion of the laminating process.

Thus, conventionally, the laminated articles being in the form of a continuous web are "steered" by applying differential air pressure to the respective cylinders at opposite ends of the upper laminating roll. This differential pressure will cause a differential nip force between opposite ends of the pressure laminating rolls, resulting in a "directional steering" of the sheet at the output of the laminating rollers.

Heretofore, it has been customary to provide independent control of the pressure to the respective air cylinders located at opposite ends of the pressure-applying laminating roller. While such a system has been satisfactory, it is extremely difficult to provide accurate control for opposite ends of the pressure cylinders utilizing independently-controlled regulators for the two cylinders.

Furthermore, in order to provide the "steering" effect with the pressure laminating rolls, it is many times necessary to adjust the total pressure either upwardly or downwardly in equal increments for various reasons, such as when the heating of the sheets is varied or when the speed is varied. Such independent control is extremely difficult, particularly since it is done at production speeds and therefore requires considerable amounts of time and dexterity for the operator to produce the desired balancing effect at different pressures on opposite ends of the pressure laminating roller.

SUMMARY OF THE INVENTION

According to the present invention, an extremely simplified unique pressure-regulating system has been developed utilizing conventional commercially-available parts that are incorporated into a fluid circuit that can be fabricated at a minimum cost and will produce automatic tracking of the pressure once a predetermined differential pressure has been established on the two air cylinders located at opposite ends of the pressure laminating roller.

More specifically, the method aspect of the present invention contemplates regulating fluid pressure from a single source to a plurality of pressure-operated devices through two substantially identical commercially-available pressure-regulating devices. Each pressure-regulating device has an inlet connected to the source and an outlet connected to the pressure-operated device, with a regulating section between the inlet and outlet controlling the outlet fluid pressure by adjusting the regulating section of the first of the pressure-regulating devices to produce a predetermined pressure at the outlet. The pressure at the outlet of the first pressure-regulating device is diverted to the regulating section of a second pressure-regulating device and an independent regulating pressure is applied to the second regulating section so that the outlet pressure of the second regulating device is less than or greater than the pressure at the outlet of the first pressure-regulating device. Once the predetermined differential has been established, the two output pressures can automatically be regulated upwardly or downwardly merely by adjustment of the first regulating device and the second output pressure will automatically be tracked through the unique circuitry of the invention.

According to one aspect of the invention, the conduit means between the outlet of the first pressure-regulating device and the second regulating device incorporates a predetermined pressure drop which is then communicated to the regulating section of the second pressure-regulating device. This pressure drop may be created by a unidirectional check valve having a predetermined pressure drop developed by an internal spring and alternatively could be an adjustable regulating device so that the pressure drop could easily be adjusted at the desire of the operator.

BRIEF DESCRIPTION OF THE DRAWINGS

The single FIGURE schematically illustrates the fluid pressure control circuit incorporating commercial components.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

The single FIGURE discloses a pressure-regulating control circuit consisting of a pressurized fluid source, generally designated by reference numeral 10, that has a conduit 12 passing through a filter 14 and a main regulator 16 to a conduit means 18 that is in communication with the inlet 20 of two regulating devices 22 and 24. The pressure-regulating devices 22 and 24 are commercially-available units that are supplied by Aerro of Lake Zurich, Ill. under Model No. 1611-FL.

For purposes of illustration, the regulating device 22 includes an inlet section 32, an outlet section 34 and a regulating section 36. The inlet section 32 communicates with the source 10 through inlet opening 20, while the outlet section 34 has an opening 37 which communicates through a conduit 38 to a one-way fluid cylinder 40 at the head end thereof. Likewise, the second regulator 24 has an inlet section 44, an outlet 46 and a regulator section 48, with the outlet section communicating with a second cylinder 50 through a conduit 52.

The first regulator 22 also has a mechanical pressure-applying mechanism or means 60 which includes a spring 62, the spring force of which is adjustable through a control knob 64 received into a threaded opening 66 and acts on a movable diaphragm 68. Likewise, the second regulator 24 has a mechanical pressure-applying means 70 including a mechanical spring 72 and a control mechanism 74 received into a threaded opening 76 at the upper end of the regulator acting on a movable diaphragm 78. Each regulator 22, 24 also has a valve stem 92 having a valve element 93 between the inlet section 32, 44 and the outlet section 34, 46. The valve stem 92 also has a valve element 94 at the upper end thereof, which forms part of the diaphragm 68, 78.

The system so far described is considered a conventional-type system for controlling the fluid or air pressure from a common source 10 to the respective fluid cylinders 40 and 50. Thus, independent control may be maintained and produce a desired outlet pressure in conduit 38 by adjusting the spring force of spring 62 through the control knob 64. This will move diaphragm 68 and open valve element 93 to pressurize outlet section 34. Likewise, outlet pressure to cylinder 50 can be controlled by adjusting the spring force of spring 72 through control knob 74 which will act on diaphragm 78 to open valve element 93 and pressurize outlet section 46.

However, as indicated above, in most instances it is desirable to be capable of varying the pressure applied by the respective cylinders 40 and 50 to produce the "steering" effect discussed above.

Moreover, in many instances, once the desired "steering" effect has been established, it may become necessary to increase or decrease the pressure on the laminating roller by equal increments to opposite ends of the laminating roller for various reasons. With the system so far described, this requires independent regulation of the outlet pressure supplied to the respective cylinders 40 and 50 to maintain the desired differential pressure at opposite ends of the laminating roll.

According to the present invention, this differential pressure is automatically tracked through a single commercially-available pressure-drop mechanism that can be incorporated into the regulating circuit at a minimum cost. Thus, as shown in the drawing, the outlet pressure of the first regulator to conduit 38 is connected to the regulating section 48 of the second regulator 24 through a uni-directional valve means 80 and a conduit 82. The uni-directional valve means 80 provides a predetermined pressure drop that is internally established through a mechanical spring 84 and the valve is commercially-available from Smart Products, Inc., San Jose, Calif., and sold under Model No. 302 PPB-15.

In order to illustrate the principles of the invention, an exemplary regulation will now be described with reference to the drawing.

Assuming that the main pressure regulator 16 is set to produce an inlet pressure of 100 psi to the inlet openings 20 of the respective regulators 22 and 24, the first step in establishing a predetermined outlet pressure is to adjust the spring force of spring 62 through control knob 64. Assuming the cylinder pressure for cylinder 40 is desired to be 50 psi, the spring tension of spring 62 will be adjusted to apply a 50 pound force onto the movable diaphragm 68 of regulator 22 and will move valve stem 92 to open valve element 93 and provide communication between inlet section 32 and outlet section 34 so that the pressure at cylinder 40 is established at 50 psi. Once the 50 psi has been established, the internal balancing forces through springs (not shown) will close valve element 93 and the equilibrium condition will be reached wherein the outlet pressure in conduit 38 is 50 psi, while the inlet pressure at conduit 18 remains at 100 psi.

Assuming also that there is a pressure drop of 20 psi across uni-directional valve 80, the 50 psi in conduit 38 will be reduced by the 20 psi factor and thus a 30 psi pressure will be delivered to the regulating section 48 of the second regulator 24. Without any spring force applied by spring 72, the force on diaphragm 78 will open valve element 93 of the second regulator 24 and establish an outlet pressure in conduit 52 of 30 psi. Thus, an automatic differential is established between the two air cylinders since cylinder 40 will have a pressure of 50 psi, while cylinder 50 will have a regulated pressure of 30 psi.

This differential pressure can automatically be maintained and increased or decreased merely by adjustment of the control knob 64 on the first regulator 22. If the pressure for the cylinders 40 and 50 is desired to be increased by 20 psi to 70 psi and 50 psi, respectively, it is only necessary to provide an additional spring force by spring 62 of 20 psi. This 20 psi will automatically increase the pressure to cylinder 40 to 70 psi, and in turn will increase the pressure to cylinder 50 to 50 psi.

Moreover, the relative differences between the pressures of the two cylinders can readily be changed by adjustment of the control knob 74 to provide an increased pressure to cylinder 50, which is greater than the pressure to cylinder 40. Thus, the second instance above, where the pressure to cylinder 40 is 70 psi, the pressure to cylinder 50 can easily be increased to 90 psi by applying a spring force of 40 pounds through the spring 72 and the pressure applied to the second cylinder 50 will automatically be increased by 20 pounds greater than the pressure of cylinder 40. With the pressure differential of 70 psi at cylinder 40 and a pressure of 90 psi at the second cylinder 50, this pressure differential can easily be maintained by reducing the force applied by the spring 62 of the first regulator 22.

With a pressure reduction, it becomes necessary to bleed excess pressure from conduit 52 as well as conduit 38 to accommodate fluid flow. It is also necessary to prevent pressure build-up in the regulator sections of regulators 22 and 24. For this purpose, the regulator sections 36, 48 have a naturally-available bleed valve incorporated into the threaded connections between control knobs 64, 74 and threaded openings 66, 76 so that there is a constant flow of fluid or air to prevent pressure build-up. Regulating section 48 also has a needle valve 98 to provide calibrated control of fluid venting and produce the desired pressure reduction therein. In addition, a needle valve 96 may be provided in conduit 52 to provide a small constant flow therefrom. Also, regulating section 36 has a vent opening 99. Moreover, a constant flow is provided from conduit 38 through check valve 80 to maintain a balanced condition in the regulator section 48 and prevent pressure build-up therein.

Thus, when the spring force developed by spring is decreased, diaphragm 68 will open to reduce air pressure in conduit 38 and this air pressure will be dissipated through threaded opening 66 and vent opening 99. At the same time, diaphragm 78 of the second regulator 24 will open to reduce the pressure in conduit 52, which will be aided by flow through needle valve 96.

Thus, a much more reliable fluid control circuit can easily be controlled and assembled using inexpensive commercially-available parts. The system can be made even more versatile by using an adjustable pressure drop check valve 80.

While the specific embodiments have been illustrated and described, numerous modifications come to mind without significantly departing from the spirit of the invention and the scope of protection is only limited by the scope of the accompanying claims.

I claim:

1. A method of regulating fluid pressure from a source to a plurality of pressure-operated devices including at least two pressure-regulating devices, each having an inlet connected to said source and an outlet connected to a pressure-operated device with a regulating section between said inlet and said outlet controlling the pressure of fluid between said inlet and said outlet, the steps of adjusting said regulating section of a first of said pressure-regulating devices to produce a predetermined pressure at said outlet and diverting the pressurized fluid from the outlet to the regulating section of a second pressure-regulating device, and applying an independent regulating pressure to said second pressure-regulating section so that the outlet pressure of said second regulating device can be independently varied and the outlet pressures of the two pressure-regulating devices can be varied by adjusting the regulating section of the first pressure-regulating device, including the further step of introducing a controlled pressure drop between the outlet of said first pressure-regulating device and the regulating section of said second pressure-regulating device.

2. A method of regulating fluid pressure from a source to a plurality of pressure-operated devices including a least two pressure-regulating devices, each having an inlet connected to said source ad an outlet connected to a pressure-operated device with a regulating section between said inlet and said outlet controlling the pressure of fluid between said inlet and said outlet, the steps of adjusting said regulating section of a first of said pressure-regulating devices to produce a predetermined pressure at said outlet and diverting the pressurized fluid form the outlet to the regulating section of a second pressure-regulating device, and applying an independent regulating pressure to said second pressure-regulating section so that the outlet pressure of said second regulating device can be independently varied and the outlet pressure of the two pressure-regulating devices can be varied by adjusting the regulating section of the first pressure-regulating device, including the further step of bleeding the pressurized fluid from said second regulating section after the outlet pressure of both said pressure-operated devices has stabilized.

3. The method as defined in claim 1, including the step of adjusting the pressure drop between said pressure-regulator devices.

4. Pressure-regulating apparatus for controlling pressurized fluid from a pressurized source to at least first and second pressurized fluid-operated devices, comprising first and second pressure regulators, each having an inlet section, an outlet section and a control section with said inlet sections connected to said pressurized fluid source and said outlet sections respectively connected to said pressurized fluid-operated devices, conduit means diverting pressurized fluid from the outlet section of said first pressure regulator to said control section of said second pressure regulator with unidirectional valve means in said conduit means, and first and second mechanical pressure-applying means in said control sections so that the outlet pressure of said first pressure regulator is a direct function of the first pressure-applying means and the outlet pressure of said second pressure regulator is a combined function of the outlet pressure of said first pressure regulator and said second pressure-applying means.

* * * * *